(12) United States Patent
Ikeda (10) Patent No.: US 12,556,510 B2
(45) Date of Patent: Feb. 17, 2026

(54) COMMUNICATION APPARATUS AND COMMUNICATION METHOD

(71) Applicant: Oki Electric Industry Co., Ltd., Tokyo (JP)

(72) Inventor: Masaya Ikeda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 136 days.

(21) Appl. No.: 18/415,514

(22) Filed: Jan. 17, 2024

(65) Prior Publication Data

US 2024/0291798 A1  Aug. 29, 2024

(30) Foreign Application Priority Data

Feb. 27, 2023  (JP) ................. 2023-028366

(51) Int. Cl.
| | |
|---|---|
| *H04L 61/5076* | (2022.01) |
| *H04L 61/5038* | (2022.01) |
| *H04L 101/622* | (2022.01) |
| *H04W 12/088* | (2021.01) |

(52) U.S. Cl.
CPC ...... *H04L 61/5076* (2022.05); *H04L 61/5038* (2022.05); *H04W 12/088* (2021.01); *H04L 2101/622* (2022.05)

(58) Field of Classification Search
CPC ............. H04L 61/5076; H04L 61/5038; H04L 2101/622; H04W 12/088
See application file for complete search history.

(56) References Cited

U.S. PATENT DOCUMENTS

| | | | | |
|---|---|---|---|---|
| 2012/0213211 A1* | 8/2012 | Remaker | ............. | H04L 63/0421 370/338 |
| 2015/0281167 A1* | 10/2015 | Seddon | ............... | H04L 61/5092 370/331 |
| 2024/0283869 A1* | 8/2024 | Verma | ..................... | H04L 61/00 |

FOREIGN PATENT DOCUMENTS

JP        2014-127838 A        7/2014

* cited by examiner

*Primary Examiner* — Brian Whipple
(74) *Attorney, Agent, or Firm* — METROLEX IP LAW GROUP, PLLC; Robert L. Scott, Esq.

(57) ABSTRACT

A communication apparatus according to one or more embodiments may include: a storage that stores MAC filtering registration information indicating a registered MAC address serving as a MAC address of a communication device which is allowed to perform communication and identification information of the communication device; a communication part configured to receive a communication packet from a network; a MAC filter processor configured to reference the MAC filtering registration information and perform filtering depending on whether or not a source MAC address of the communication packet matches the registered MAC address; and a MAC filter controller configured to use the identification information to update the registered MAC address.

8 Claims, 8 Drawing Sheets

MAC ADDRESS (HEXADECIMAL NOTATION): XX-XX-XX-XX-XX-XX

FIRST OCTET IN BINARY NOTATION:

REGISTERED MAC ADDRESS IS RANDOMLY GENERATED MAC ADDRESS.

THEREAFTER, WHEN MAC ADDRESS IS CHANGED, COMMUNICATION MAY BE FILTERED.

WHEN MAC ADDRESS IS CHANGED, NETBIOS NAME OF DEVICE IS USED, AND THUS REGISTERED INFORMATION CAN BE AUTOMATICALLY UPDATED.

REGISTER — 102a

REJECT — 102b

FIG. 7A

10 MEMORY    11 PROCESSOR

FIG. 7B

12 PROCESSING CIRCUIT

| ETHERNET HEATER | DESTINATION MAC ADDRESS | SOURCE MAC ADDRESS | TYPE | |
|---|---|---|---|---|
| IP HEADER | PACKET LENGTH | DESTINATION IP ADDRESS | SOURCE IP ADDRESS | OTHERS |
| TCP/UDP HEADER | SOURCE PORT NUMBER | DESTINATION PORT NUMBER | DATA LENGTH | OTHERS |
| NBT HEADER | TRANSACTION ID | OPCODE | QUERY | RECORD |

FIG. 12

COMMUNICATION APPARATUS AND COMMUNICATION METHOD

CROSS REFERENCE TO RELATED APPLICATIONS

This application claims priority based on 35 USC 119 from prior Japanese Patent Application No. 2023-028366 filed on Feb. 27, 2023, entitled "COMMUNICATION APPARATUS AND COMMUNICATION METHOD," the entire contents of which are incorporated herein by reference.

BACKGROUND

The disclosure relates to communication apparatuses and communication methods.

A communication apparatus is used that has the MAC address filtering function of performing filtering using a MAC address to allow communication of a communication device which uses a registered MAC address (see, for example, Patent Document 1: Japanese Patent Application Publication No. 2014-127838).

In recent years, in order to enhance security performance, a communication device that has the MAC address randomization function of randomly changing the MAC address of the communication device has been used.

SUMMARY

However, when a registered MAC address for allowing communication is changed by the MAC address randomization function, data from a communication device the MAC address of which is registered cannot be received.

Hence, an object of one aspect or aspects of the disclosure is to make it possible to receive, even when a MAC address is randomly changed, data from a communication device the MAC address of which is registered in a MAC address filtering function.

A communication apparatus according to an aspect may include: A communication apparatus according to one or more embodiments may include: a storage that stores MAC filtering registration information indicating a registered MAC address serving as a MAC address of a communication device which is allowed to perform communication and identification information of the communication device; a communication part configured to receive a communication packet from a network; a MAC filter processor configured to reference the MAC filtering registration information and perform filtering depending on whether or not a source MAC address of the communication packet matches the registered MAC address; and a MAC filter controller configured to use the identification information to update the registered MAC address.

A communication apparatus according to another aspect may include: a storage that stores MAC filtering registration information of each of one or more communication devices indicating a registered MAC address serving as a MAC address of the communication device which is allowed to perform communication with the communication apparatus, and identification information of the communication device; a communication part configured to receive a communication packet from a source communication device via a network; a MAC filter processor configured to reference the MAC filtering registration information and perform filtering depending on whether or not a MAC address of the communication packet from the source communication device matches the registered MAC address of one of the one or more communication devices; and a MAC filter controller configured to use the identification information of the source communication device registered in the MAC filtering registration information to update the registered MAC address of the source communication device.

A communication method according to another aspect include: receiving a communication packet from a network; referencing MAC filtering registration information that indicates a registered MAC address serving as a MAC address of a communication device which is allowed to perform communication and identification information of the communication device to perform filtering depending on whether or not a source MAC address of the communication packet matches the registered MAC address; and using the identification information to update the registered MAC address.

According to at least one of the aspects described above, it is possible to receive, even when a MAC address is randomly changed, data from a communication device the MAC address of which is registered in a MAC address filtering function.

DETAILED DESCRIPTION

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Figure 1:
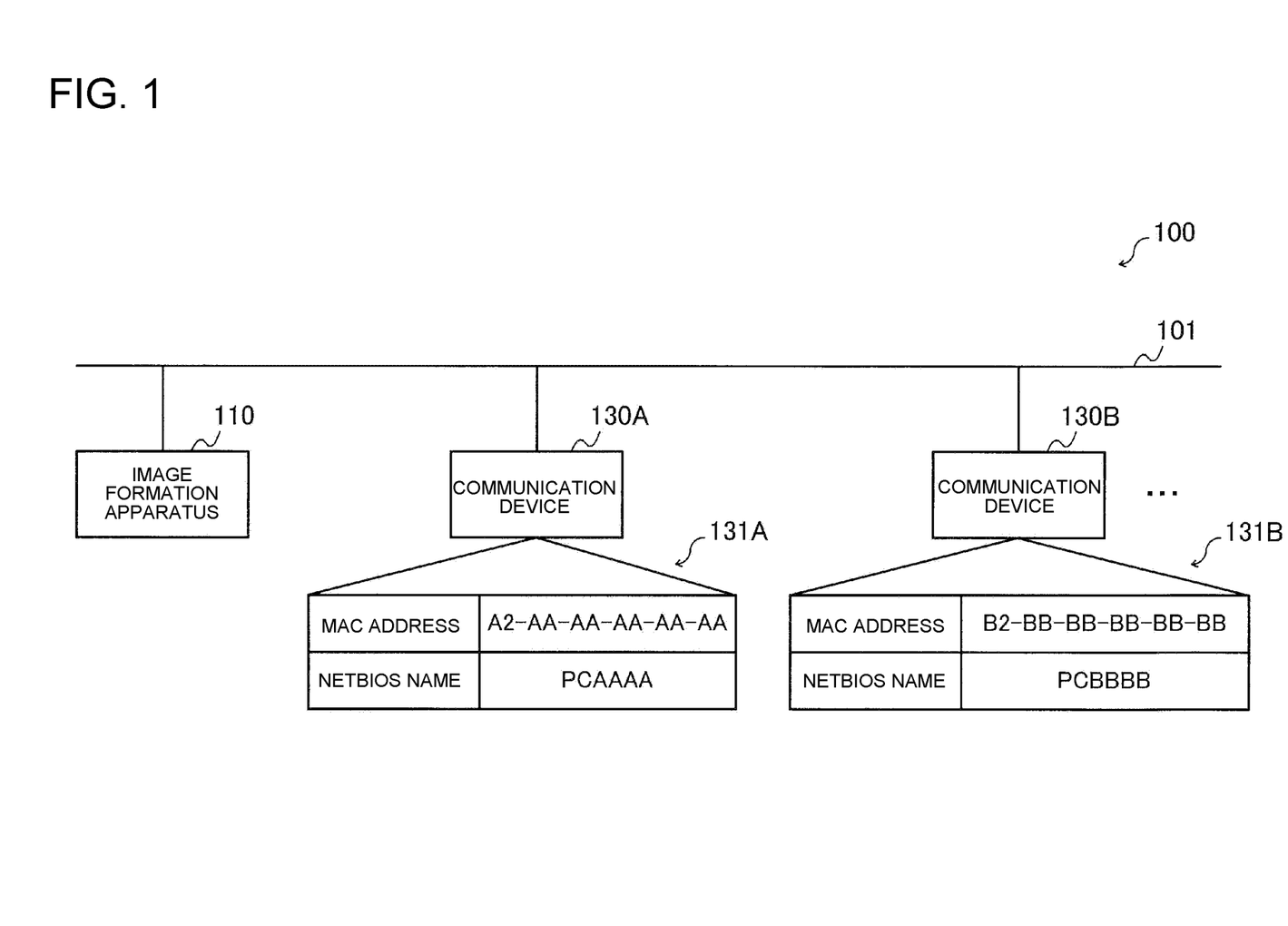
FIG. 1 is a block diagram illustrating an example of the connection configuration of a communication system.

FIG. 1 is a block diagram illustrating an example of the connection configuration of a communication system 100 that includes an image formation apparatus 110 according to an embodiment. The communication system 100 includes the image formation apparatus 110, a communication device 130A and a communication device 130B. Here, the image formation apparatus 110 functions as a communication apparatus.

The image formation apparatus 110, the communication device 130A and the communication device 130B are connected to the same network 101. The image formation apparatus 110 has a MAC address filtering function. The communication device 130A includes setting information 131A for performing communication, and the communication device 130B includes setting information 131B for performing communication. In the following description, when it is not necessary to particularly distinguish between the communication device 130A and the communication device 130B, each of the communication device 130A and the communication device 130B is referred to as the communication device 130. Although in FIG. 1, the two communication devices 130 are illustrated, the number of communication devices 130 is not limited to two, and the communication system 100 may include three or more communication device.

The setting information 131A includes the MAC address of the communication device 130A and a NetBIOS name. The setting information 131B includes the MAC address of the communication device 130B and a NetBIOS name. Here, the MAC address of the communication device 130 is not a unique value but is randomly changed by a known technique. The timing with which the MAC address is changed is different depending on an OS (Operating System), the maker of the communication device 130 or the like. For example, there is a communication device 130 that randomly changes the MAC address every 24 hours. In the following description, the MAC address that is randomly changed is referred to as the random MAC address.

Figure 2:
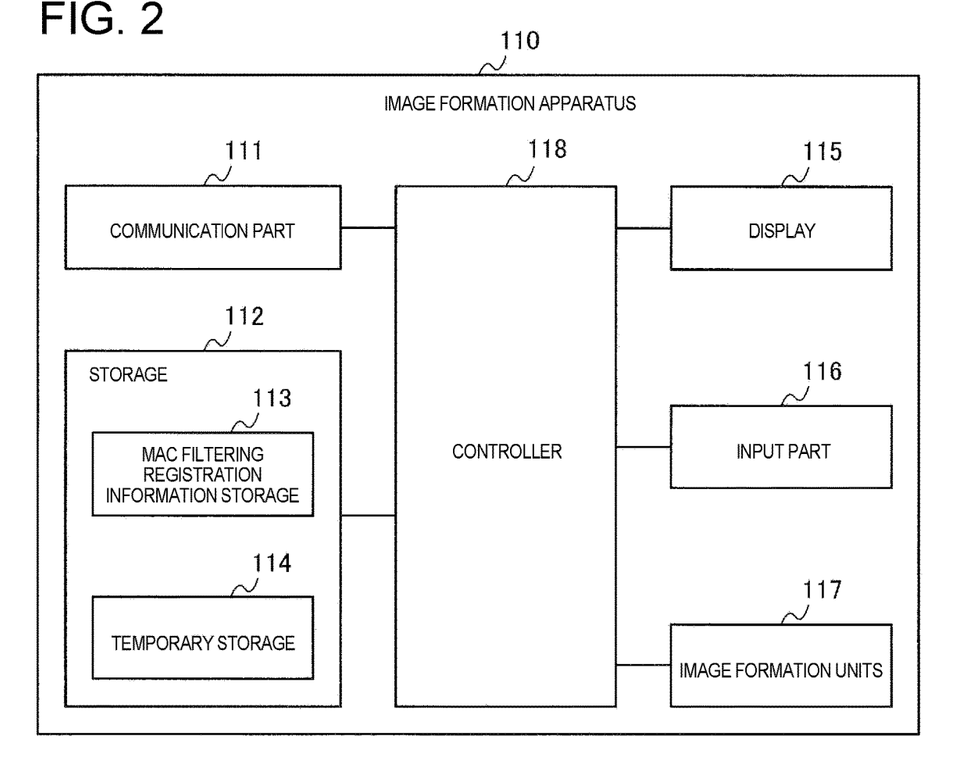
FIG. 2 is a block diagram schematically illustrating the configuration of an image formation apparatus according to an embodiment.

FIG. 2 is a block diagram schematically illustrating the configuration of the image formation apparatus 110 according to the embodiment. The image formation apparatus 110 includes a communication part 111, a storage 112, a display 115 (or a display device 115), an input part 116, an image formation unit 117 and a controller 118.

The communication part 111 performs communication via the network 101 by wireless or wired connection. For example, the communication part 111 receives a communication packet from the network 101. The communication part 111 transmits, to the network 101, a NBNS (NetBIOS Naming Service) query that is a request using a NetBIOS name. Furthermore, the communication part 111 receives, from the network 101, a NBNS replay that is a response to the NBNS query.

The storage 112 stores information necessary for processing in the image formation apparatus 110. Here, the storage 112 includes a MAC filtering registration information storage 113 and a temporary storage 114.

Figure 3:
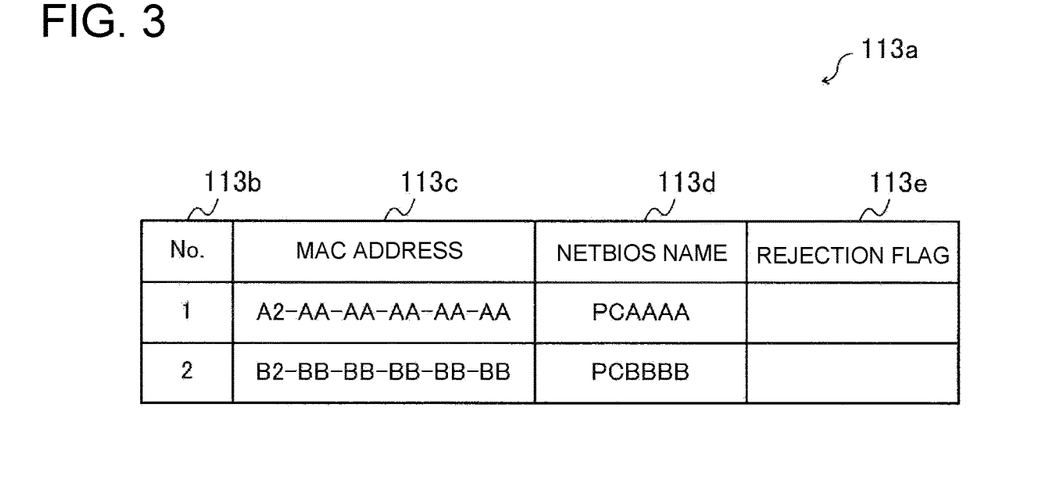
FIG. 3 is a schematic view illustrating an example of MAC filtering registration information.

The MAC filtering registration information storage 113 stores MAC filtering registration information. FIG. 3 is a schematic view illustrating an example of the MAC filtering registration information. The MAC filtering registration information 113a illustrated in FIG. 3 is information in a table format that includes a number column 113b, a MAC address column 113c, a NetBIOS column 113d and a rejection flag column 113e.

The number column 113b stores an identification number for identifying each row. The MAC address column 113c registers the MAC address of the communication device 130 that receives data. Here, a MAC address that is registered in the MAC filtering registration information is also referred to as a registered MAC address.

The NetBIOS column 113d stores the NetBIOS name. Here, when the MAC address registered in the MAC address column 113c in the same row is a MAC address that is randomly changed, and the user of the communication device 130 that has the MAC address registered in the MAC address column 113c in the same row allows the use of the NetBIOS name, the NetBIOS name is stored.

When the user of the communication device 130 that has the MAC address registered in the MAC address column 113c in the same row rejects the use of the NetBIOS name, the rejection flag column 113e stores ON as a rejection flag which indicates that the use of the NetBIOS name is rejected. In FIG. 3, such a flag is not stored, and thus the rejection flag column 113e is blank.

As described above, the MAC filtering registration information 113a indicates the registered MAC address that is the MAC address of the communication device 130 which is allowed to perform communication and the NetBIOS name that is the identification information of the communication device 130. Furthermore, the MAC filtering registration information 113a indicates the rejection flag that is information as to whether or not the use of the NetBIOS name serving as the identification information of the communication device 130 is allowed.

With reference back to FIG. 2, the temporary storage 114 temporarily stores the MAC address in order to use it for the initial registration of the NetBIOS name or the updating of the MAC address.

The display 115 displays various types of screens. For example, the display 115 indicates the state of the image formation apparatus 110 or the like to the user. The input part 116 receives inputs of various types of instructions. For example, the input part 116 receives inputs of a value for forming an image by the user, the MAC address that is registered and the like. The image formation unit 117 is a printer part that forms an image on a medium. The controller 118 controls the processing in the image formation apparatus 110.

Figure 4:
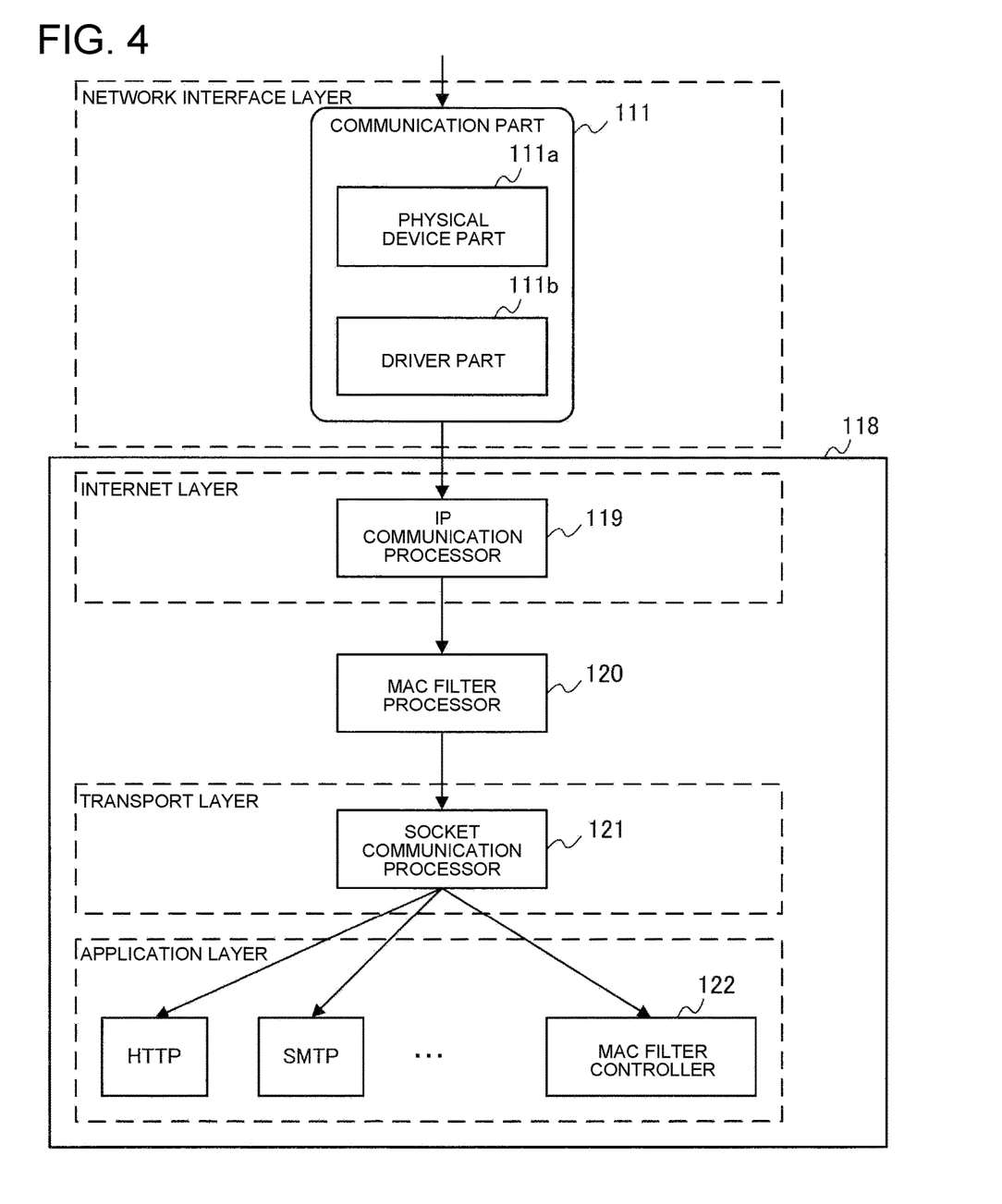
FIG. 4 is a block diagram schematically illustrating the configuration of a communication part and a controller.

FIG. 4 is a block diagram schematically illustrating the configuration of the communication part 111 and the controller 118. According to a TCP/IP (Transmission Control Protocol/Internet Protocol) hierarchical structure for communication, the communication part 111 performs processing as a network interface layer, and the controller 118 performs processing as an Internet layer, a transport layer and an application layer.

The controller 118 includes an IP communication processor 119 that performs processing as the Internet layer, a MAC filter processor 120 that is positioned between the Internet layer and the transport layer, a socket communication processor 121 that performs processing for the transport layer and a MAC filter controller 122 that is included in the application layer.

The MAC filter controller 122 receives an input of the MAC address to be registered in the MAC filtering registration information via the display 115 and the input part 116. Then, the MAC filter controller 122 determines whether or not the input MAC address is the random MAC address.

Furthermore, the MAC filter controller 122 uses the NetBIOS name serving as the identification information of the communication device 130 to update the registered MAC address that is the MAC address registered in the MAC filtering registration information. Here, when the registered MAC address is the random MAC address, and the user of the communication device 130 allows the use of the NetBIOS name, the MAC filter controller 122 updates the registered MAC address. A configuration may be adopted in which the use of the NetBIOS name does not need to be allowed by the user of the communication device 130 and when the registered MAC address is the random MAC address, the MAC filter controller 122 updates the registered MAC address.

Figure 5:
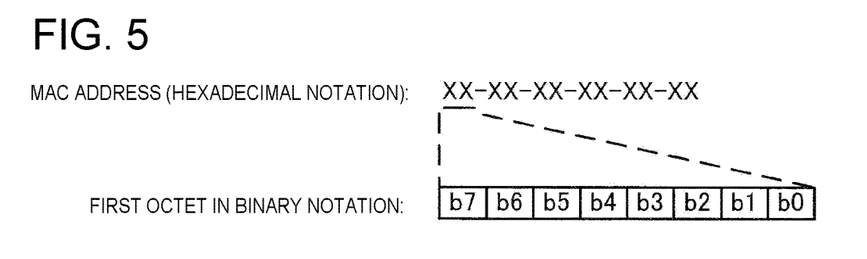
FIG. 5 is a schematic view for illustrating the specifications of a random MAC address.

FIG. 5 is a schematic view for illustrating the specifications of the random MAC address. A "G/L bit" and an "I/G bit" are defined in the first octet of the MAC address. In the case of a MAC address unique to the device instead of the random MAC address, these bits are "0" and "0", respectively. By contrast, in the random MAC address, the I/G bit is defined as "0", and the G/L bit is defined as "1".

As illustrated in FIG. 5, the first octet in binary notation is "b7", "b6", "b5", "b4", "b3", "b2", "b1" and "b0". In the first octet in hexadecimal notation, the first character is "b7", "b6", "b5" and "b4", and the second character is "b3", "b2", "b1" and "b0".

The "G/L bit" and the "I/G bit" correspond to "b1" and "b0" in the second character, respectively, and are defined as "01" as described above. Hence, by the combination of the remaining two bits in the second character, the second character in the first octet is "0010", "0110", "1010" or "1110". When the second character is converted into hexadecimal notation, the second character is "2", "6", "A" or "E". Therefore, when the second character in the first octet is "2", "6", "A" or "E", the MAC address thereof can be determined to be the random MAC address.

With reference back to FIG. 4, when the input MAC address is the random MAC address, the MAC filter controller 122 causes the display 115 to display a notification screen for providing notification that the MAC address to be registered may be randomly changed, and thus communication may be rejected by filtering of the MAC address, and the rejection of communication can be avoided by registering the NetBIOS name. Then, the MAC filter controller 122 receives, via the input part 116, from the user, an input of an instruction as to whether or not the NetBIOS name is used.

Figure 6:
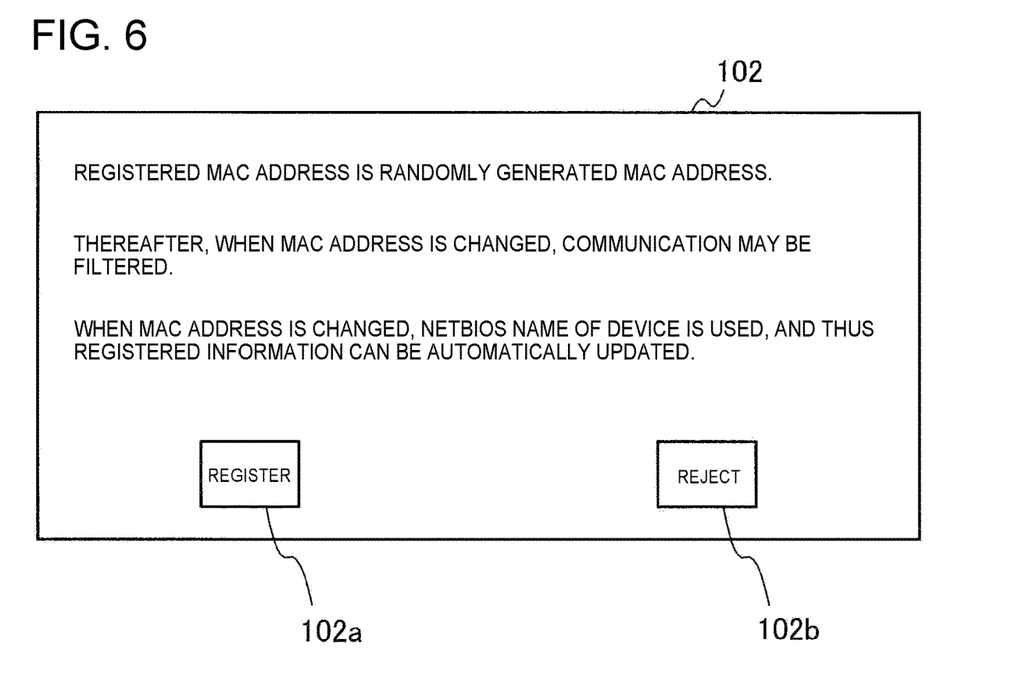
FIG. 6 is a schematic view illustrating an example of a notification screen.

For example, the MAC filter controller 122 causes the display 115 to display a notification screen 102 as illustrated in FIG. 6. Then, when the user input, via the input part 116, an execution instruction with a registration input region 102a selected, the MAC filter controller 122 determines that the user allows the use of the NetBIOS name whereas when the user inputs an execution instruction with a rejection input region 102b selected, the MAC filter controller 122 determines that the user rejects the use of the NetBIOS name. When as described above, the user rejects the use of the NetBIOS name, the MAC filter controller 122 stores, in the registration filtering registration information, "ON" of the rejection flag in the distance flag column in the row in which the registered MAC address is stored.

When a new MAC address is registered in the MAC filtering registration information, the NetBIOS name of the communication device 130 that uses the MAC address thereof is not registered in the MAC filtering registration information. The MAC filter controller 122 acquires the NetBIOS name from the communication packet with timing at which the communication device 130 participates in the network 101, and registers the NetBIOS name in the MAC filtering registration information. This processing is described later.

In other words, when the registered MAC address is the random MAC address, and the user of the communication device 130 allows the use of the NetBIOS name, the NetBIOS name is included in the MAC filtering registration information. A configuration may be adopted in which the use of the NetBIOS name does not need to be allowed by the user. In this case, when the registered MAC address is the random MAC address, the NetBIOS name is included in the MAC filtering registration information.

Furthermore, the MAC filter controller 122 updates the registered MAC address. For example, the MAC filter controller 122 acquires the MAC address that has been randomly changed by sending a request using the NetBIOS name to the network 101 via the communication part 111 and receiving a response to the request via the communication part 111 so as to update the registered MAC address. For example, when a source MAC address (a MAC address of a source communication device) is temporarily stored in the temporary storage 114, the MAC filter controller 122 sends the request to the network 101 via the communication part 111. As described later, when the source MAC address of the communication packet does not match the registered MAC address, and the source MAC address is the random MAC address, the MAC filter processor 120 temporarily stores the source MAC address in the temporary storage 114. Then, when the MAC address acquired as described above matches the source MAC address temporarily stored in the storage 114, the MAC filter controller 122 replaces the registered MAC address with the source MAC address temporarily stored in the storage 114.

The communication part 111 transmits and receives the communication packet. The communication part 111 includes a physical device part 111a and a driver part 111b.

The physical device part 111a transmits and receives the signal of the communication packet to and from the network 101. For example, the physical device part 111a converts the communication packet including an Ethernet header processed in the driver part 111b into a signal, and transmits the signal to the network 101. The physical device part 111a converts the signal received from the network 101 into the communication packet.

The driver part 111b processes the part of the Ethernet header in the communication packet. For example, the driver part 111b adds the Ethernet header to an IP packet from the IP communication processor 119 to generate a communication packet, and provides the communication packet to the physical device part 111a. The driver part 111b processes the Ethernet header of the communication packet from the physical device part 111a, and provides the communication packet with the Ethernet header to the IP communication processor 119.

The IP communication processor 119 processes the part of an IP header. For example, the IP communication processor 119 adds the IP header to a packet from the socket communication processor 121 to generate an IP packet, and provides the IP packet to the communication part 111. The IP communication processor 119 processes the IP header included in the communication packet from the communication part 111, and provides the communication packet with the IP header to the MAC filter processor 120.

The MAC filter processor 120 receives the communication packet from the IP communication processor 119, and references the MAC filtering registration information stored in the MAC filtering registration information storage 113 to perform MAC filtering. For example, the MAC filter processor 120 references the MAC filtering registration information to perform filtering depending on whether or not the source MAC address of the communication packet matches the registered MAC address. The processing here is described later.

For the communication packet including the source MAC address allowed to performed communication in the MAC filtering, the MAC filter processor 120 uses the part other than the Ethernet header and the IP header as the packet to provide it to the socket communication processor 121.

The socket communication processor 121 processes the part of the header of the packet according to the protocol of the transport layer. For example, the socket communication processor 121 adds the header corresponding to the protocol of the transport layer to data from the application layer to generate a packet, and provides the packet to the IP communication processor 119. The socket communication processor 121 processes the header included in the packet from the MAC filter processor 120, and provides, to the application layer, the part of data included in a payload other than the packet.

Figure 7A:
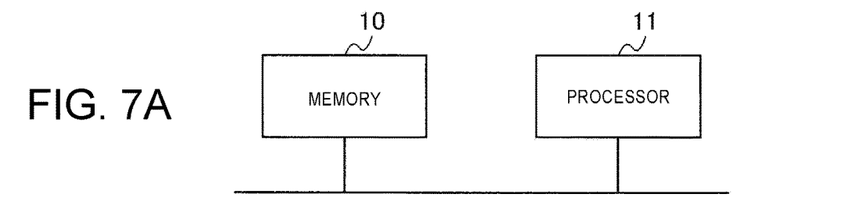
FIGS. 7A and 7B are block diagrams illustrating examples of a hardware configuration.

A part or all of the controller 118 described above can be formed with, for example, as illustrated in FIG. 7A, a memory 10 and a processor 11 such as a CPU (Central Processor) that executes a program stored in the memory 10. Such a program may be provided through the network or may be recorded in a recording medium and then provided. In other words, such a program may be provided as, for example, a program product.

Figure 7B:
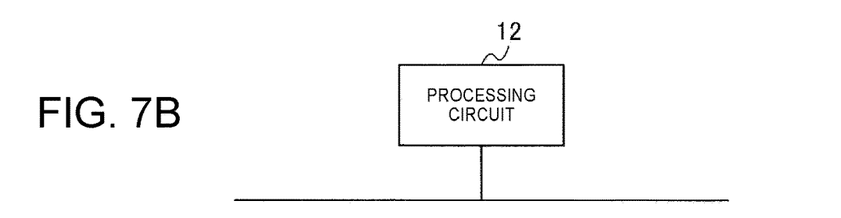

A part or all of the controller 118 can also be formed with, for example, as illustrated in FIG. 7B, a processing circuit 12 such as a single circuit, a composite circuit, a processor that is operated with a program, a parallel processor that is operated with a program or an ASIC (Application Specific Integrated Circuit) or an FPGA (Field Programmable Gate Array). As described above, the controller 118 can be realized by a processing circuit network.

The communication part 111 can be formed with a communication I/F (Interface) that performs communication via the network 101. The storage 112 can be formed with storage devices such as a non-volatile memory, a volatile memory, an HDD (Hard Disk Drive) and an SSD (Solid State Drive).

The display 115 can be formed with a display. The input part 116 can be formed with an input I/F such as an input button. The display 115 and the input part 116 may be formed with a touch panel.

Figure 8:
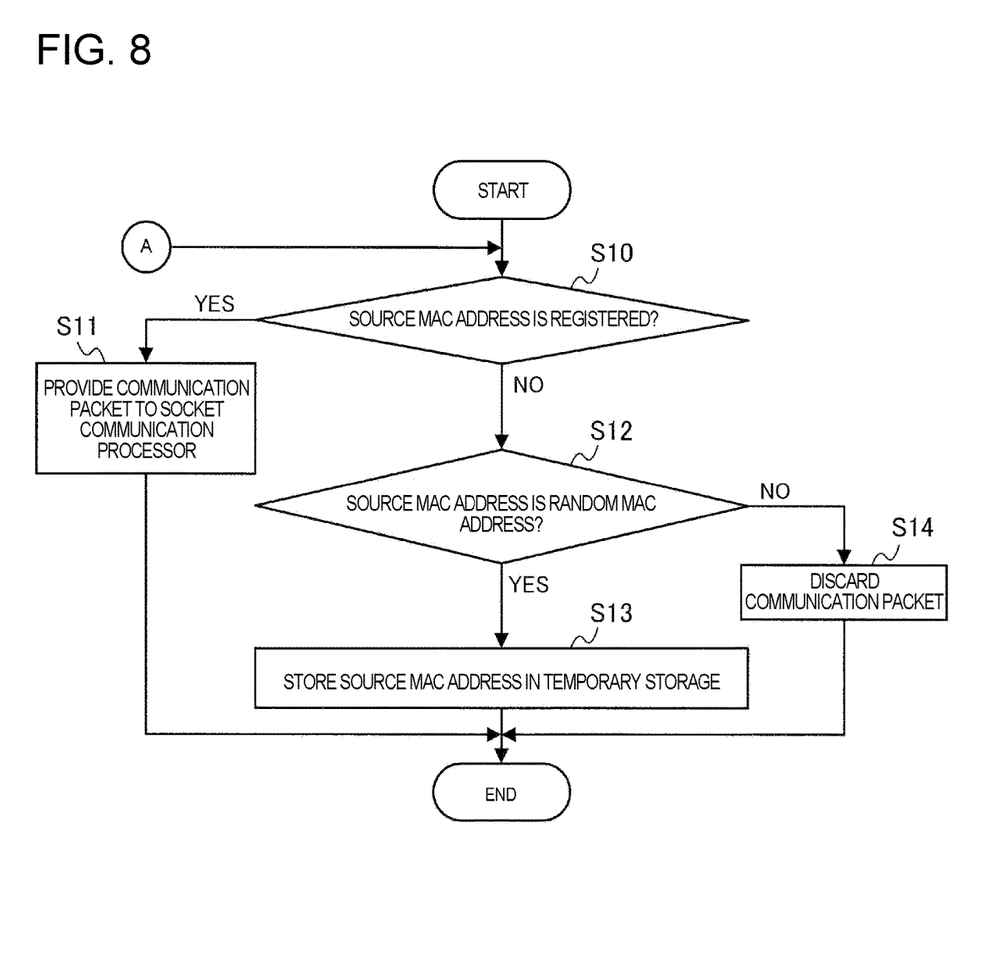
FIG. 8 is a flowchart of processing when a MAC filter processor receives a communication packet from an IP communication processor.

FIG. 8 is a flowchart of processing when the MAC filter processor 120 receives the communication packet from the IP communication processor 119. The flowchart in FIG. 8 is started when the IP communication processor 119 receives the communication packet from the IP communication processor 119.

The MAC filter processor 120 first determines, in the filtering of the MAC address, whether or not the registered MAC address that matches the source MAC address of the received communication packet is present in the MAC filtering registration information stored in the MAC filtering registration information storage 113 (S10). When the registered MAC address as described above is present (YES in S10), the processing proceeds to step S11 whereas when the registered MAC address as described above is not present (NO in S10), the processing proceeds to step S12.

In step S11, the received communication packet is the communication packet from the communication device 130 that is allowed to perform communication, and thus the MAC filter processor 120 provides the communication packet to the socket communication processor 121.

In step S12, the MAC filter processor 120 determines whether or not the source MAC address of the received communication packet is the random MAC address. When the source MAC address is the random MAC address (YES in S12), the processing proceeds to step S13 whereas when the source MAC address is not the random MAC address (NO in S12), the processing proceeds to step S14.

In step S13, in order to notifies the source MAC address determined to be the random MAC address to the MAC filter controller 122, the MAC filter processor 120 stores the source MAC address in the temporary storage 114. Then, the MAC filter processor 120 discards the communication packet.

On the other hand, in step S14, since the source MAC address (the MAC address of the source communication device) is not the random MAC address but is the MAC address unique to the source communication device, and the source communication device 130 is not allowed to perform communication with the image formation apparatus, the MAC filter processor 120 does not provide the communication packet to the socket communication processor 121 and discards the communication packet.

Figure 9:
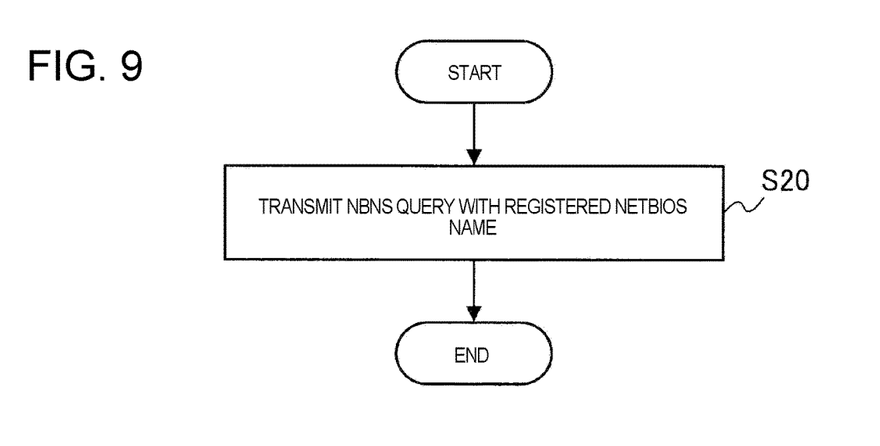
FIG. 9 is a flowchart illustrating the operation of a MAC filter controller when the source MAC address of a communication packet is stored in a temporary storage.

FIG. 9 is a flowchart illustrating the operation of the MAC filter controller 122 when the source MAC address of the communication packet is stored in the temporary storage 114 in step S13 of FIG. 8. The flowchart in FIG. 9 is started when the MAC filter controller 122 which monitors the temporary storage 114 detects that the MAC address is stored in the temporary storage 114.

For all NetBIOS names registered in the MAC filtering registration information stored in the MAC filtering registration information storage 113, the MAC filter controller 122 sends a NBNS query that is a packet of a name resolution request in a NBT (NetBIOS over TCP/IP) protocol using the NetBIOS name (S20).

Figure 10:
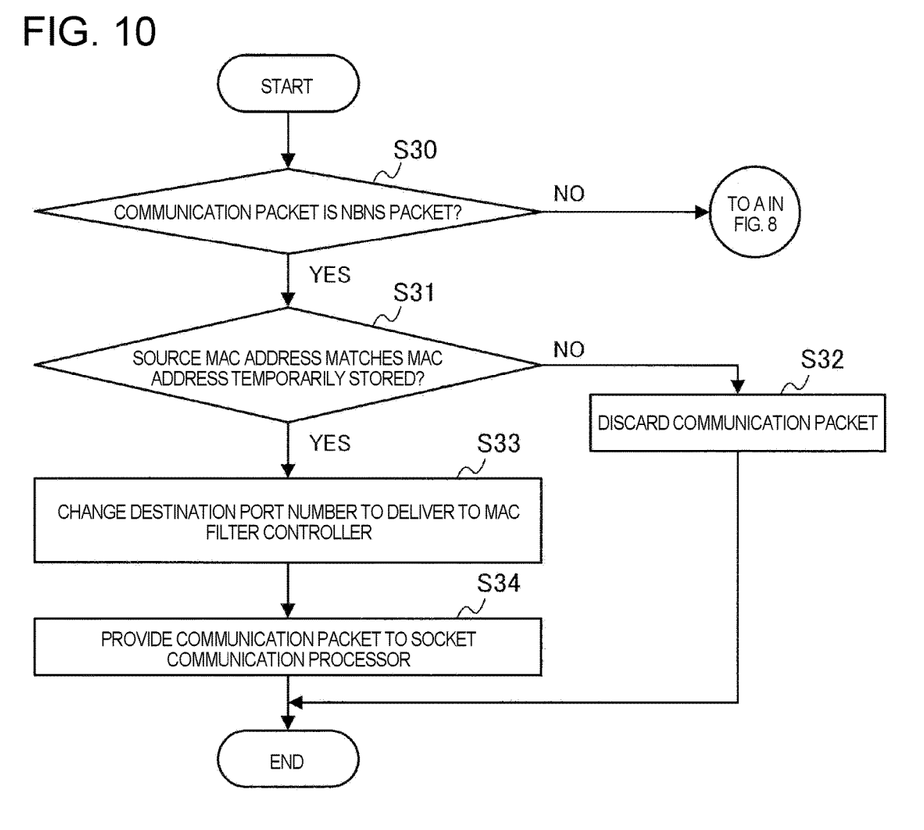
FIG. 10 is a flowchart illustrating the operation of the MAC filter processor that receives the communication packet from the IP communication processor after transmission processing of a NBNS query is performed.

FIG. 10 is a flowchart illustrating the operation of the MAC filter processor 120 that receives the communication packet from the IP communication processor 119 after transmission processing of the NBNS query is performed in step S20 of FIG. 9. The MAC filter processor 120 receives the communication packet from the IP communication processor 119, and thus the flowchart in FIG. 10 is started.

The MAC filter processor 120 first identifies a protocol used by the communication packet received from the IP communication processor 119, and determines whether or not the communication packet is a NBNS packet (S30). When the communication packet is the NBNS packet (YES in S30), the processing proceeds to step S31 whereas when the communication packet is not the NBNS packet (NO in S30), the processing proceeds to step S10 of FIG. 8.

Figure 11:
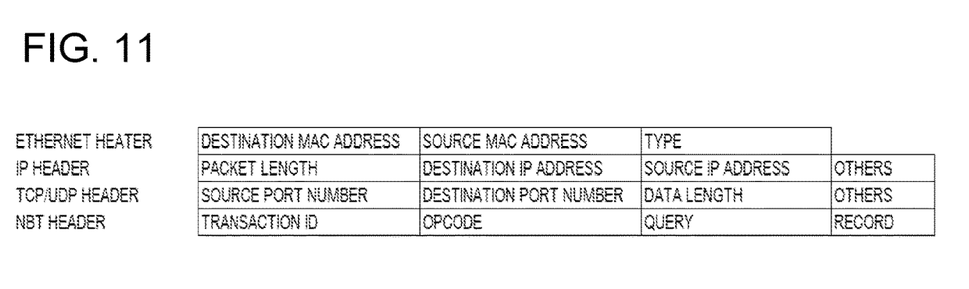
FIG. 11 is a schematic view for illustrating the structure of the communication packet.

FIG. 11 is a schematic view for illustrating the structure of the communication packet. The communication packet includes an Ethernet header, an IP header and a TCP/UDP header. When the communication packet is the NBNS packet, the communication packet includes a NBT header.

Here, the MAC filter processor 120 references a destination port number in the TCP/UDP header to be able to identify the protocol. When the destination port number is "137", the communication packet is the NBNS packet serving as the communication packet using a NBT protocol.

With reference back to FIG. 10, in step S31, the MAC filter processor 120 determines whether or not the source MAC address of the received communication packet matches the source MAC address temporarily stored in the temporary storage 114 in step S13 of FIG. 8. When these source MAC addresses do not match each other (NO in S31), the processing proceeds to step S32 whereas when these source MAC addresses match each other (YES in S31), the processing proceeds to step S33.

In step S32, since the received communication packet (here, the NBNS packet) is not the communication packet from the communication device 130 that is a search target, the MAC filter processor 120 does not pass the communication packet to the socket communication processor 121 so as to prevent further processing, and discards the communication packet.

On the other hand, in step S33, the MAC filter processor 120 changes the destination port number of the TCP/UDP header of the received communication packet so as to deliver the communication packet to the MAC filter controller 122.

Then, the MAC filter processor 120 removes the Ethernet header and the IP header from the communication packet to generate a packet, and provides the packet to the socket communication processor 121 (S34). The socket communication processor 121 processes the header included in the packet from the MAC filter processor 120, and delivers data included in a payload other the packet to the MAC filter controller 122.

Figure 12:
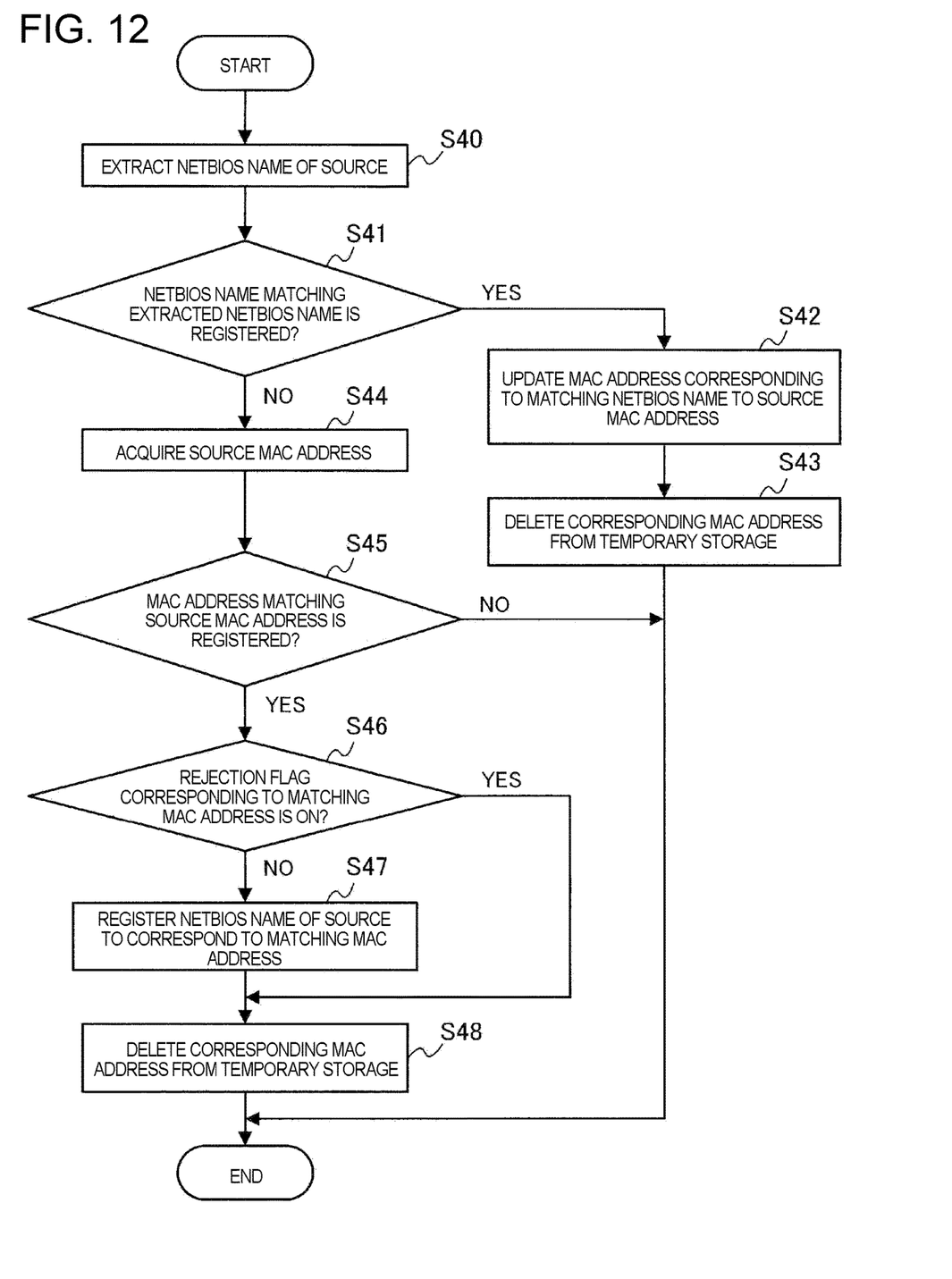
FIG. 12 is a flowchart illustrating the operation of the MAC filter controller when data is provided from a socket communication processor to the MAC filter controller.

FIG. 12 is a flowchart illustrating the operation of the MAC filter controller 122 when the data is provided from the socket communication processor 121 to the MAC filter controller 122 after the processing in step S34 of FIG. 11. The MAC filter controller 122 receives the data from the socket communication processor 121, and thus the flowchart illustrated in FIG. 12 is started.

The MAC filter controller 122 first analyzes the received data to extract the NetBIOS name of the source in NBNS communication (S40).

Then, the MAC filter controller 122 uses the extracted NetBIOS name as a key to search the MAC filtering registration information stored in the MAC filtering registration information storage 113, and thereby determines whether or not the matching NetBIOS name is registered (S41). When the matching NetBIOS name is registered (YES in S41), the processing proceeds to step S42 whereas when the matching NetBIOS name is not registered (NO in S41), the processing proceeds to step S44.

In step S42, the MAC filter controller 122 updates the MAC address corresponding to the matching NetBIOS name in the MAC filtering registration information to the source MAC address stored in the temporary storage 114. Then, the MAC filter controller 122 deletes the source MAC address stored in the temporary storage 114 (S43).

On the other hand, in step S44 and the subsequent steps, the MAC filter controller 122 performs initial registration processing on the NetBIOS name. In step S44, the MAC filter controller 122 first acquires the source MAC address stored in the temporary storage 114.

Then, the MAC filter controller 122 determines whether or not the registered MAC address that matches the source MAC address is present in the MAC filtering registration information stored in the MAC filtering registration information storage 113 (S45). When such a registered MAC address is present (YES in S45), the processing proceeds to step S46 whereas when such a registered MAC address is not present (NO in S45), the updating of the MAC filtering registration information cannot be performed, and thus the processing is completed.

In step S46, the MAC filter controller 122 determines whether or not the rejection flag of the NetBIOS name corresponding to the matching registered MAC address in step S45 in the MAC filtering registration information is ON. When the rejection flag is not ON (NO in S46), the use of the NetBIOS name is allowed from the user, and thus the processing proceeds to step S47 whereas when the rejection flag is ON (YES in S46), the use of the NetBIOS name is rejected from the user, and thus the processing proceeds to step S48.

In step S47, the MAC filter controller 122 registers the NetBIOS name extracted in step S40 such that the NetBIOS name corresponds to the matching registered MAC address in step S45 in the MAC filtering registration information. Then, the processing proceeds to step S48.

In step S48, the MAC filter controller 122 deletes the source MAC address stored in the temporary storage 114.

Figure 13:
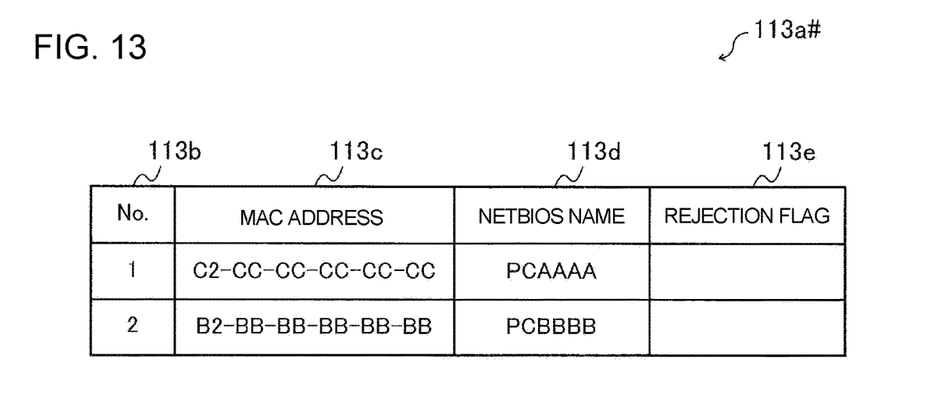
FIG. 13 is a schematic view illustrating an example of updating of the MAC filtering registration information.

For example, when the MAC filtering registration information 113a illustrated in FIG. 3 is stored in the MAC filtering registration information storage 113, even if the random MAC address of the communication device 130A is changed from "A2-AA-AA-AA-AA-AA" to "C2-CC-CC-CC-CC-CC", the operation described above is performed, and thus as in the MAC filtering registration information 113a illustrated in FIG. 13, "PCAAAA" that is the NetBIOS name of the communication device 130A is used to update the registered MAC address to "C2-CC-CC-CC-CC-CC". Thereafter, until the MAC address of the communication device 130A is changed again, the communication device 130A can communicate with the image formation apparatus 110.

Figure 14:
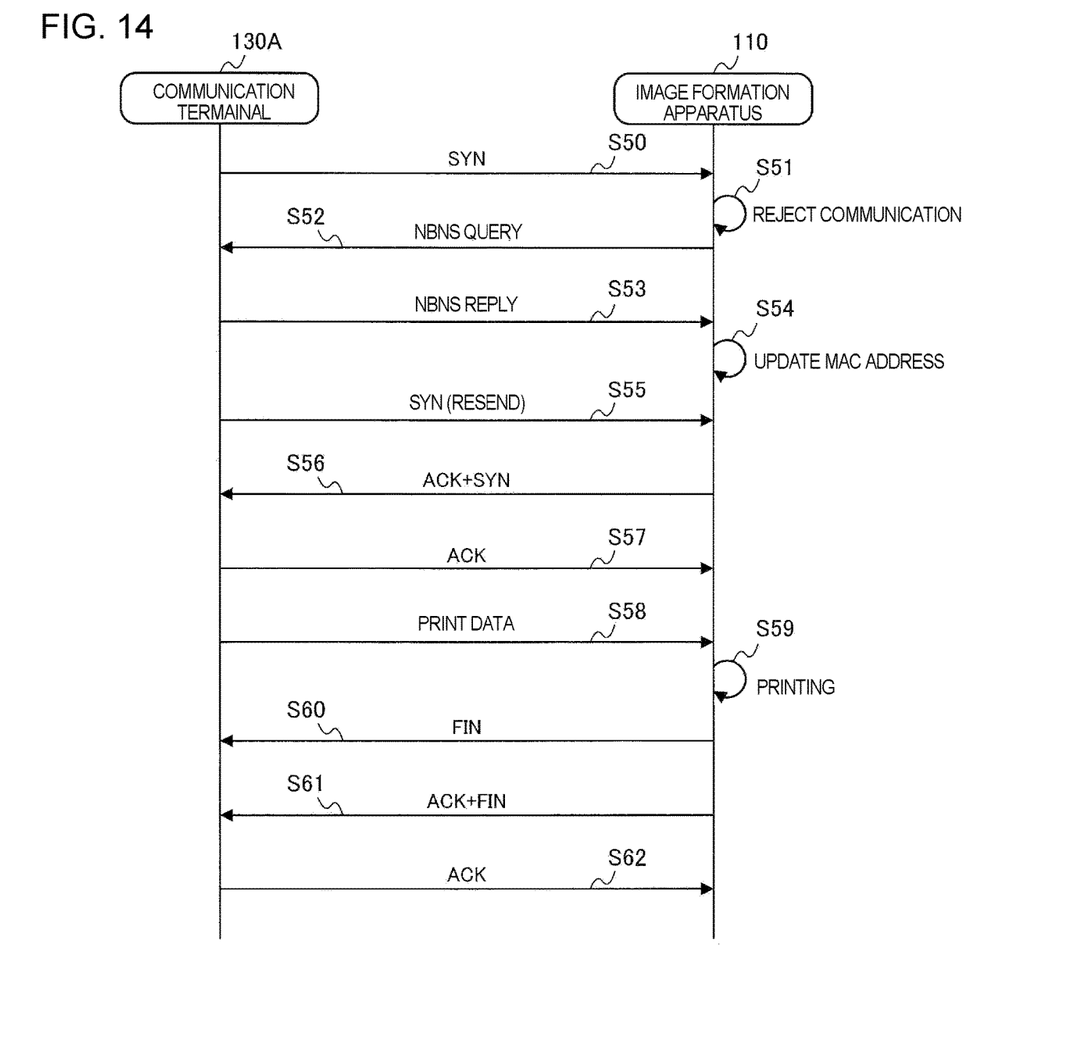
FIG. 14 is a sequence diagram illustrating communication between a communication device and the image formation apparatus when the MAC address of the communication device is registered in the MAC filtering registration information and is thereafter changed randomly and then a print request is made to the image formation apparatus.

FIG. 14 is a sequence diagram illustrating communication between the communication device 130A and the image formation apparatus 110 when the MAC address of the communication device 130A is registered in the MAC filtering registration information and is thereafter changed randomly and then a print request is made to the image formation apparatus 110.

The communication device 130A transmits a TCP connection establishment request in order to exchange print data serving as image formation data with the image formation apparatus 110 (S50). Here, since the MAC address of the communication device 130A that is the source of the TCP connection establishment request has been randomly changed, the MAC address is different from the registered MAC address registered in the MAC filtering registration information of the image formation apparatus 110.

Hence, the MAC filter processor 120 of the image formation apparatus 110 rejects communication of the TCP connection establishment request (S51). The processing in step S51 corresponds to the processing in steps S10 (NO), S12 and S13 of FIG. 8.

Then, the MAC filter controller 122 of the image formation apparatus 110 transmits the NBNS query with the NetBIOS name of the MAC filtering registration information (S52). The processing in step S52 corresponds to the processing in step S20 of FIG. 9.

The communication device 130A replies to the NBNS query for its own NetBIOS name (S53). When the MAC filter controller 122 of the image formation apparatus 110 receives such a reply, the MAC filter controller 122 updates the MAC filtering registration information (S54). The processing here corresponds to the processing in steps S30 (YES), S31, S33 and S34 of FIG. 10 and steps S40, S41, S42 and S43 of FIG. 12.

Since the communication device 130A does not obtain a response to the TCP connection establishment request in step S50, the communication device 130A transmits the TCP connection establishment request again (S55).

Here, in the MAC filtering registration information of the image formation apparatus 110, the changed MAC address of the communication device 130A is registered, and thus the MAC filter processor 120 does not reject the communication, and the controller 118 of the image formation apparatus 110 returns a confirmation response (S56). Thereafter, between the communication device 130A and the image formation apparatus 110, general TCP communication and the transmission and reception of print data are performed, and thus printing is performed (S57 to S62).

In the embodiment described above, the NetBIOS name is used to identify the communication device 130, and thus even when the MAC address of the communication device 130 is randomly changed, the MAC address registered in the MAC filtering registration information can be updated as necessary. In this way, even when the MAC address is randomly changed, it is possible to continuously perform communication. Hence, for a MAC address that is randomly changed, a widely used MAC address filtering function can be utilized.

Although in the embodiment described above, the NetBIOS name is used to update the MAC address, the embodiment is not limited to this example. For example, the host name of Bonjour may be used as identification information.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A communication apparatus comprising:
a storage that stores MAC filtering registration information;
a communication part comprising a communication interface configured to receive a communication packet from a network; and
a controller comprising a circuit or a processor configured to:
receive an input of an MAC address of a communication device to be registered in the MAC filtering registration information;
in response to determining that the input MAC address to be registered is a random MAC address, display a notification screen providing a notification that the MAC address to be registered is a random MAC address and a prompt to select whether to permit use of identification information of the communication device for preventing filtering-based rejection of communication, to register, in the MAC filtering registration information, the MAC address of the communication device in association with a rejection flag indicating whether the use of the identification information of the communication device is permitted;
in response to receiving a communication packet from the network, reference the MAC filtering registration information and determine whether or not a source MAC address of the communication packet matches the MAC address registered in the MAC filtering registration information; and
in response to determining that the source MAC address of the communication packet does not match the registered MAC address and is a random MAC address, update the registered MAC address with the source MAC address by using the identification information of the communication device.

2. The communication apparatus according to claim 1, wherein
the controller is configured, in response to determining that the source MAC address of the communication packet does not match the registered MAC address and is a random MAC address, to send a request using the identification information of the communication device to the network via the communication part and receive a response to the request including a MAC address of the communication device corresponding to the identification information via the communication part.

3. The communication apparatus according to claim 2, wherein
the controller is configured, in response to determining that the source MAC address does not match the registered MAC address and is the random MAC address, to temporarily store the source MAC address in the storage, send the request to the network via the communication part using the identification information of the communication device to the network, and receive the response to the request including the MAC address of the communication device corresponding to the identification information.

4. The communication apparatus according to claim 3, wherein
the controller is configured, in response to determining that the MAC address included in the response matches the source MAC address temporarily stored in the storage, to update the registered MAC address with the source MAC address temporarily stored in the storage.

5. A communication method comprising:
receiving an input of an MAC address of a communication device to be registered in a MAC filtering registration information;
in response to determining that the input MAC address to be registered is a random MAC address, displaying a notification screen providing a notification that the MAC address to be registered is a random MAC address and prompts to select whether to permit use of identification information of the communication device for preventing filtering-based rejection of communication, to register, in the MAC filtering registration information, the MAC address of the communication device in association with a rejection flag indicating whether the use of the identification information of the communication device is permitted;
receiving a communication packet from a network;
in response to receiving the communication packet from the network, referencing MAC filtering registration information and determining whether or not a source MAC address of the communication packet matches the MAC address registered in the MAC filtering registration information; and
in response to determining that the source MAC address of the communication packet does not match the registered MAC address and is a random MAC address, updating the registered MAC address with the source MAC address by using the identification information of the communication device.

6. The communication method according to claim 5, wherein
updating the registered MAC address with the source MAC address of the communication packet comprises:
sending a request using the identification information to the network; and receiving a response to the request including a MAC address of the communication device corresponding to the identification information.

7. The communication method according to claim 6, wherein
updating the registered MAC address with the source MAC address of the communication packet comprises: temporarily storing the source MAC address; sending the request using the identification information to the network; and receiving the response to the request including the MAC address of the communication device corresponding to the identification information.

8. The communication method according to claim 7, wherein
when the MAC address included in the response matches the source MAC address temporarily stored, the registered MAC address is updated with the source MAC address temporarily stored.

* * * * *